United States Patent [19]
Ashton

[11] Patent Number: 5,729,672
[45] Date of Patent: *Mar. 17, 1998

[54] RAY TRACING METHOD AND APPARATUS FOR PROJECTING RAYS THROUGH AN OBJECT REPRESENTED BY A SET OF INFINITE SURFACES

[75] Inventor: Martin Ashton, Berkhamstead, United Kingdom

[73] Assignee: Videologic Limited, Hertfordshire, United Kingdom

[*] Notice: The term of this patent shall not extend beyond the expiration date of Pat. No. 5,596,685.

[21] Appl. No.: 468,382

[22] Filed: Jun. 6, 1995

Related U.S. Application Data

[63] Continuation-in-part of Ser. No. 280,649, Jul. 26, 1994, Pat. No. 5,596,685.

[30] Foreign Application Priority Data

Jul. 30, 1993 [GB] United Kingdom ............... 9315852
Jan. 31, 1995 [GB] United Kingdom ............... 9501834

[51] Int. Cl.$^6$ .................................................. G06T 15/60
[52] U.S. Cl. ............................................. 395/126; 395/121
[58] Field of Search .......................... 395/121–2, 126, 395/133

[56] References Cited

U.S. PATENT DOCUMENTS

| | | | |
|---|---|---|---|
| 4,865,423 | 9/1989 | Doi | 364/514 A |
| 5,088,054 | 2/1992 | Paris, II | 395/121 |
| 5,101,475 | 3/1992 | Kaufman et al. | 395/124 |
| 5,142,617 | 8/1992 | Dalrymple et al. | 395/132 |
| 5,226,113 | 7/1993 | Cline et al. | 395/124 |
| 5,313,568 | 5/1994 | Wallace et al. | 395/126 |
| 5,317,689 | 5/1994 | Nack et al. | 395/163 |
| 5,355,442 | 10/1994 | Paglieroni et al. | 395/127 |
| 5,377,313 | 12/1994 | Scheibl | 395/122 |
| 5,402,532 | 3/1995 | Epstein et al. | 395/122 |
| 5,416,729 | 5/1995 | Leon et al. | 364/578 |

FOREIGN PATENT DOCUMENTS

| | | |
|---|---|---|
| 0 358 493 | 3/1990 | European Pat. Off. . |
| 0 393 309 | 10/1990 | European Pat. Off. . |

*Primary Examiner*—Joseph H. Feild
*Assistant Examiner*—Rudolph Buchel
*Attorney, Agent, or Firm*—Flynn, Thiel, Boutell & Tanis, P.C.

[57] ABSTRACT

A method and apparatus for shading three-dimensional images for display on a screen by displaying each object as a group of infinite surfaces, projecting rays into the image, determining the location of the intersection of each ray with each surface and determining whether any intersected surface is visible at an elementary, pixel, level. Shading that occurs as a in-image light projection is analyzed by designating the generated light as a light volume determining the intersection of the ray with the light volume, and shading the pixel point as a function of the relationship between the visible surface and the light volume. The rate of shading is enhanced by dividing the screen into a number of sub-regions and determining the location of the intersection of each object contained with the sub-region through the rays projected into the sub region. The size of the sub-regions is set by determining a bounding volume for each object on the display screen and subdividing the display based on the bounding volumes. The apparatus that performs this shading has a plurality of groups of processing elements; each group of processing elements has its own cache for storing and defining surfaces of the image. The apparatus determines depth values for the surfaces of the image based on data contained in the cache for first group of processors and then determines depth values based on the data contained in the cache for the second group of processors.

31 Claims, 9 Drawing Sheets

RAY TRACING METHOD AND APPARATUS FOR PROJECTING RAYS THROUGH AN OBJECT REPRESENTED BY A SET OF INFINITE SURFACES

This application is a continuation-in-part of application U.S. Ser. No. 08/280649 filed Jul. 26, 1994. Now U.S. Pat. No. 5,596,685.

FIELD OF THE INVENTION

This invention relates to a system for shading three-dimensional images and in particular to a system which can do this substantially in real time.

BACKGROUND OF THE INVENTION

The best known prior art systems for generating fully occulted real time 3D images is the Z-buffer or depth buffer image precision algorithm. This may be implemented in either software or hardware and is used in systems produced by companies such as Silicon Graphics, Evens and Sutherland, and Hewlett Packard.

The Z-buffer algorithm requires a frame buffer in which colour values are stored for each pixel in an image. In addition to this it requires a Z-buffer with an entry for each pixel. In this a Z value (depth value) is stored for each pixel. To generate a 3D representation polygons, such as triangles, are rendered into the frame buffer in arbitrary order. During scan conversion of the polygon if a point on a polygon is no further from the viewer than the point already in the buffer for that pixel then the new point's colour and Z value replace the old values. No presorting is necessary and no object to object comparisons are required.

Z-buffer type systems require a high level of integration and performance and are very expensive. It is necessary to use a high performance frame buffer and Z-buffer if real time performance is to be achieved.

SUMMARY OF THE INVENTION

Preferred embodiments of the present invention enable a highly integrated, low cost, high performance real time three-dimensional graphics system to be produced.

Preferably the invention is embodied in a scalable regular pipeline structure which is highly suitable for cost effective VLSI (very large scale integration) implementation. Using such a scalable approach means that a 3D graphics rendering system may be provided on a single chip.

Refinements to the system enable features such as shadows, anti-aliasing, soft shadows, transparency, depth of field effects, motion blur, curved surfaces, and direct implementation of constructive solid geometry (CSG) to be supported. Some of these features, e.g. real time shadow generation, are extremely difficult to implement using Z-buffer techniques and therefore very few high performance systems actually implement them. The approach taken by the present invention enables features such as shadows to be implemented in relatively straightforward manner.

The present invention is based on the use of a ray casting technique for rendering of three-dimensional images rather than conventional polygon based rendering techniques.

In a preferred embodiment of the invention objects are each represented by a set of surfaces which are stored as sets of data. An image plane is deemed to lie between a viewer and the scene to be viewed and this is comprised of a plurality of elementary areas (pixels). A ray is assumed to pass from the viewpoint through an elementary area of the screen into the scene to be viewed and will intersect various surfaces which represent an object in the scene. By analysis of these intersections and their distances from the viewer we can determine whether any surface is visible and thus whether that pixel should be rendered with a particular shade.

Using this approach requires a continuous stream of similar calculations to be performed. The set of surfaces for each object in the scene have to be tested at each pixel and the shade assigned to the closest visible surface is given to that pixel. Such a technique can be implemented in a pipeline fashion. This enables it to be highly integrated and trade-offs can be introduced between performance/complexity and cost.

The system is implemented in a pipeline type processor comprising a number of cells each of which can perform an intersection calculation with a surface. Thus a large number of surface intersections can be computed simultaneously. Each cell is loaded with a set of coefficients defining the surface for which it is to perform the intersection test.

The system is capable of generating shadows by defining volumes in shadow in the same way as solid objects, that is to say they are defined as a set of infinite surfaces. These shadow objects are then processed in the same way as solid objects. Once all the shadow and non-shadow objects have been processed, it is a straightforward matter to determine whether the surface visible at a particular pixel is in shadow by comparing the position of the visible surface with the furthest forward facing surface and the nearest reverse facing surface of the shadow object and checking to see whether the visible surface is within that range. If it is then a flag associated with that surface is set to indicate that a modification to its shade or colour needs to be made to simulate the effect of shadowing.

Preferred embodiments of the present invention seek to improve the performance of the pipeline processor subdividing a scene into a variety of sub-regions for processing. These sub-regions are preferably rectangular tiles.

Another embodiment of this invention seeks to provide a system in which spotlight-type effects can be generated within a scene.

The invention is defined in its various aspects with more precision in the appended claims to which reference should now be made.

BRIEF DESCRIPTION OF THE DRAWINGS

An embodiment of the invention will now be described in detail by way of example with reference to the accompanying drawings in which:

FIG. 2 a) b), and c) shows shapes which may be manipulated and rendered by an embodiment of the invention;

DETAILED DESCRIPTION OF PREFERRED EMBODIMENTS

Figure 1:
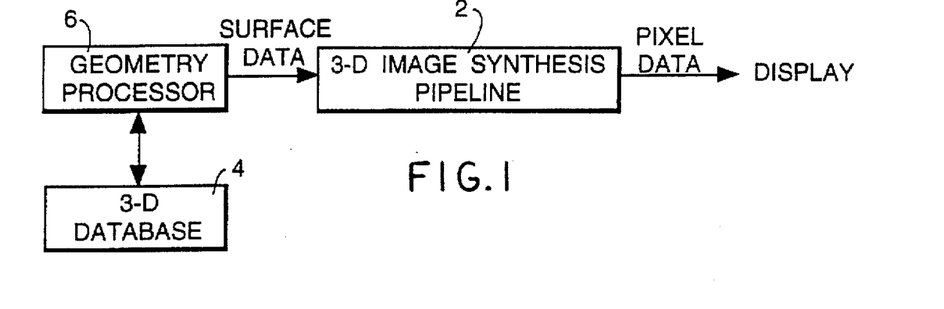
FIG. 1 shows a schematic block diagram of a system embodying the invention.

FIG. 1 shows a 3D image synthesis pipeline 2 in which manipulation of image surfaces is performed according to a predetermined set of rules to allocate shades to individual picture elements (pixels). The three-dimensional image data which is acted upon by the pipeline 2 is stored in a 3D database 4. A geometry processor 6 is provided between the database and the pipeline so that data from the database can be manipulated prior to rendering by the pipeline. Manipulation can consist of functions such as object rotation, translation, viewpoint changes and shading calculations. Some form of user input can be provided to this so that real time interactive manipulation of the 3D database is possible. The image provided by the geometry processor to the pipeline is surface data which is converted by the pipeline to pixel data for display.

Figure 2A:
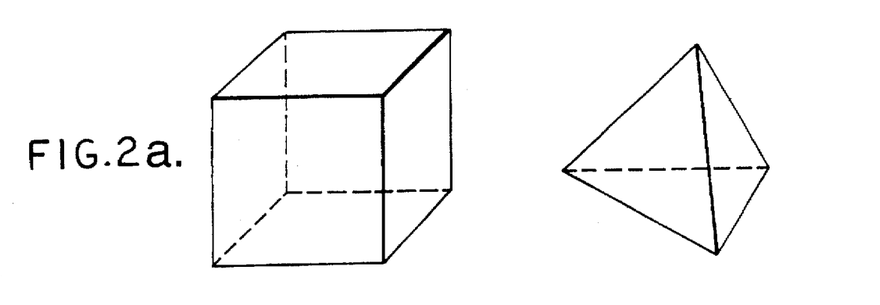
Figure 2B:
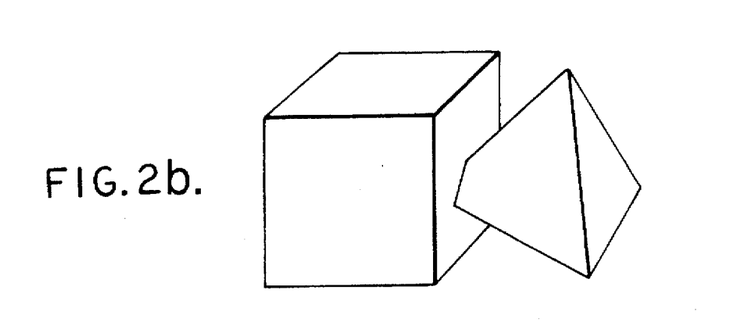
Figure 2C:
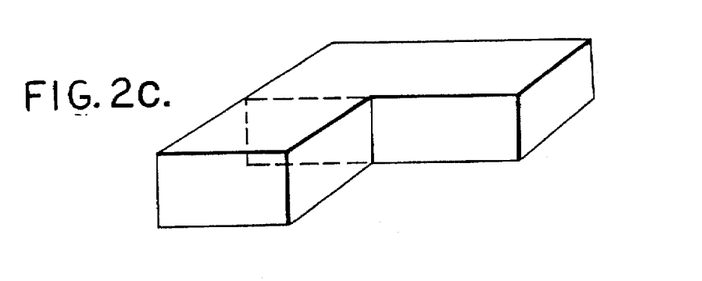

The pipeline processor of FIG. 1 is based upon a ray tracing algorithm rather than a polygon based rendering algorithm. In the ray racing algorithm each three-dimensional shape to be represented is modelled as a collection of objects as shown in FIG. 2A. These may intersect one another as shown in FIG. 2B in dependence on what is required to produce an approximation of the original shape. Any concavities in the original object are broken down into a number of blocks as illustrated in FIG. 2C.

Each object is defined solely as a number of surfaces. In the examples shown in FIG. 2 these surfaces are all planar but the system is versatile enough to handle curved surfaces. The edges and the vertices of each object are implicitly defined from the intersections of the surfaces and thus there is no requirement to store edge or vertex data.

Before rendering of a scene can commence each surface in that scene is classified as either a forward or reverse surface. This is done by setting a flag which is stored with data defining each surface. The forward surface represents the condition where a line normal to the surface points towards the observer. The reverse surface is the opposite.

The ray tracing technique operates by taking each object in turn, and, by imagining a ray from the observer's eye passing through a chosen point (a pixel) in the image plane, intersects all the surfaces defined in that object. Once this has been done the forward surface intersection furtherest from the eye and the reverse surface intersection closest to the eye are determined. This is illustrated in FIG. 3.

Figure 3:
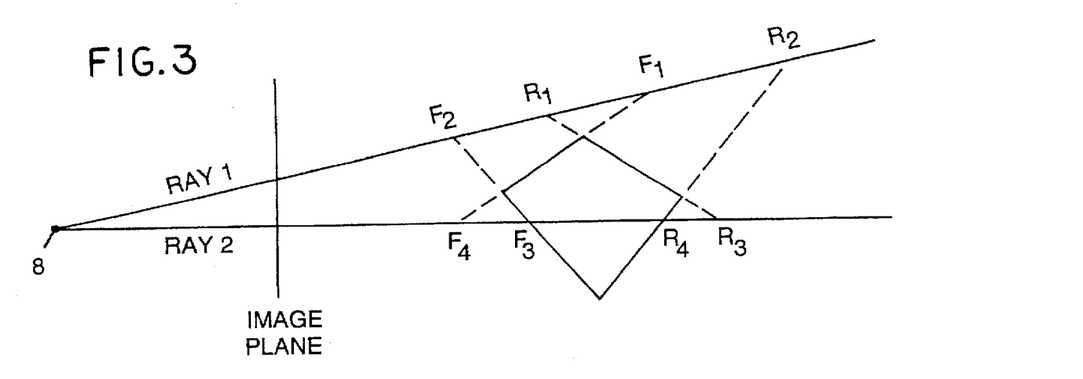
FIG. 3 shows a cross-section through two ray/surface intersections of an object illustrating an embodiment of the invention.

In FIG. 3 ray 1 and ray 2 both start from an observation point 8. The object is defined by four surfaces in the plane of the cross-section of FIG. 3. The forward surface intersection of Ray 1 furthest from the observation point 8 is F1 and the reverse surface intersection closest to the observation point is R1.

This condition where the closest reverse surface intersection is nearer to the observation point than the furthest forward intersection indicates that ray 1 does not intersect the object. This particular object is therefore not visible at the pixel in he image place through which ray 1 passes. Ray 2, on the other hand, has its nearest reverse intersection at R4 which is further from the observation point 8 than the furthest forward surface intersection at F3. This indicates that the object is visible in the image plane at the pixel through which ray 2 passes. This pixel is therefore allocated a shade which has been allocated to that surface. This shade is usually stored with data defining the surface and may be a grey scale value or an R, G, B value for a full colour system. This technique for allocating a shade to a particular pixel for a single object is called the inter-rule set.

The process if repeated for each object in the scene and the visible surface of the object nearest to the eye, if any, which intersects a ray passing through a particular pixel is selected to derive a shade for that pixel. This is termed the intra-rule set.

The shade which is applied to a particular pixel can then be calculated from the properties and orientation of the visible surface. If there are no visible surfaces intersected by a ray then the shade assigned to the pixel through which that ray passes will be the background shade. The shade may be a grey scale value or it may be a full R, G, B, value. It will be appreciated that the entire ray tracing process has to be executed for every point in the image plane with every surface of every object.

The process of finding surface ray intersections can be reduced to a very simple operation from the data which defines each surface. This is explained below.

Each surface can be represented in vector form in the following manner:

$$n \cdot x = k$$

where n=a unit normal vector to the surface pointing towards the origin (usually the observation point), usually stored as the cosine of the angle from the origin.

k=perpendicular distance to the origin from the surface x=a point on a surface (coordinates)

A line or ray is represented in vector form as follows:

$$P1+U(P2-P1)$$

where

P1=base vector or distance from the origin to the observation point.

P2=A point on the ray in the centre of a pixel on the image plane.

U=A measure of how far along the ray an intersection occurs at point x.

Therefore:

$$n \cdot (P1 + U(P2 - P1)) = k$$

and $$U = \frac{k - n \cdot P1}{n \cdot (P2 - P1)}$$

The parameter u is negative behind the surface that is intersected, ranges from 0 to 1 between P1 and P2, and is greater than 1 for points in front of the image plane. Thus, the parameter U gives a measure of distance from the observer, through a point on the image plane, to a given surface. This requires a division per pixel as we pass a ray through each pixel on the image plane. However, the inverse of this parameter, 1/U, does not require any divisions but still gives a measure of the distance to the surface. In this case it approaches zero as the distance to the surface goes towards infinity. This inverse measure of distance is normally called depth. Therefore by comparing the depth of every surface at each pixel using the following equation, we can find which surface is visible at each pixel $$1/U = n \cdot (P2 - P1)/(k - n \cdot P1)$$

Expanding the vectors in this equation gives the following result:

$$1/U = (n1 \cdot (xs - xe) + n2 \cdot (ys - ye) + n3 \cdot (zs - ze))/(k - (n1 \cdot xe + n2 \cdot ye + n3 \cdot ze))$$

where xs ys zs are image plane intersection coordinates and xe ye ze are coordinates of the eye point.

If the centre of the projection, the eye point, is also at the centre of the image plane the above equation reduces to the following:

$$1/U = (n1 \cdot xs + n2 \cdot ys + n3 \cdot (zs - ze))/(k - n3 \cdot ze)$$

This can be rationalised into a more general form as shown below:

$$1/U = A \cdot xs + B \cdot ys + C$$

A,B,C, are constant for each surface in a particular scene, and thus the above equation can be used to derive the distance to each surface on each ray.

xs and ys are coordinates of the pixel in the image plane from which the distance to each surface is to be calculated using the equation.

The image is normally built up by scanning the image plane in a raster type fashion thus for any particular surface, after the starting depth has been calculated, the depth at each pixel can be calculated by incrementing by A as we traverse in a horizontal direction in the image plane, and by B as we traverse in the vertical direction. As was stated earlier the depth of every surface has to be calculated for every pixel in the image plane. This is a considerable number of calculations. However, as the depth calculation between horizontally adjacent pixels only requires a single addition and multiple pixels can be operated on in parallel, a very efficient parallel architecture can be devised. One possible architecture which can also process shadows and transparent objects is described below with reference to FIG. 4.

Figure 4:
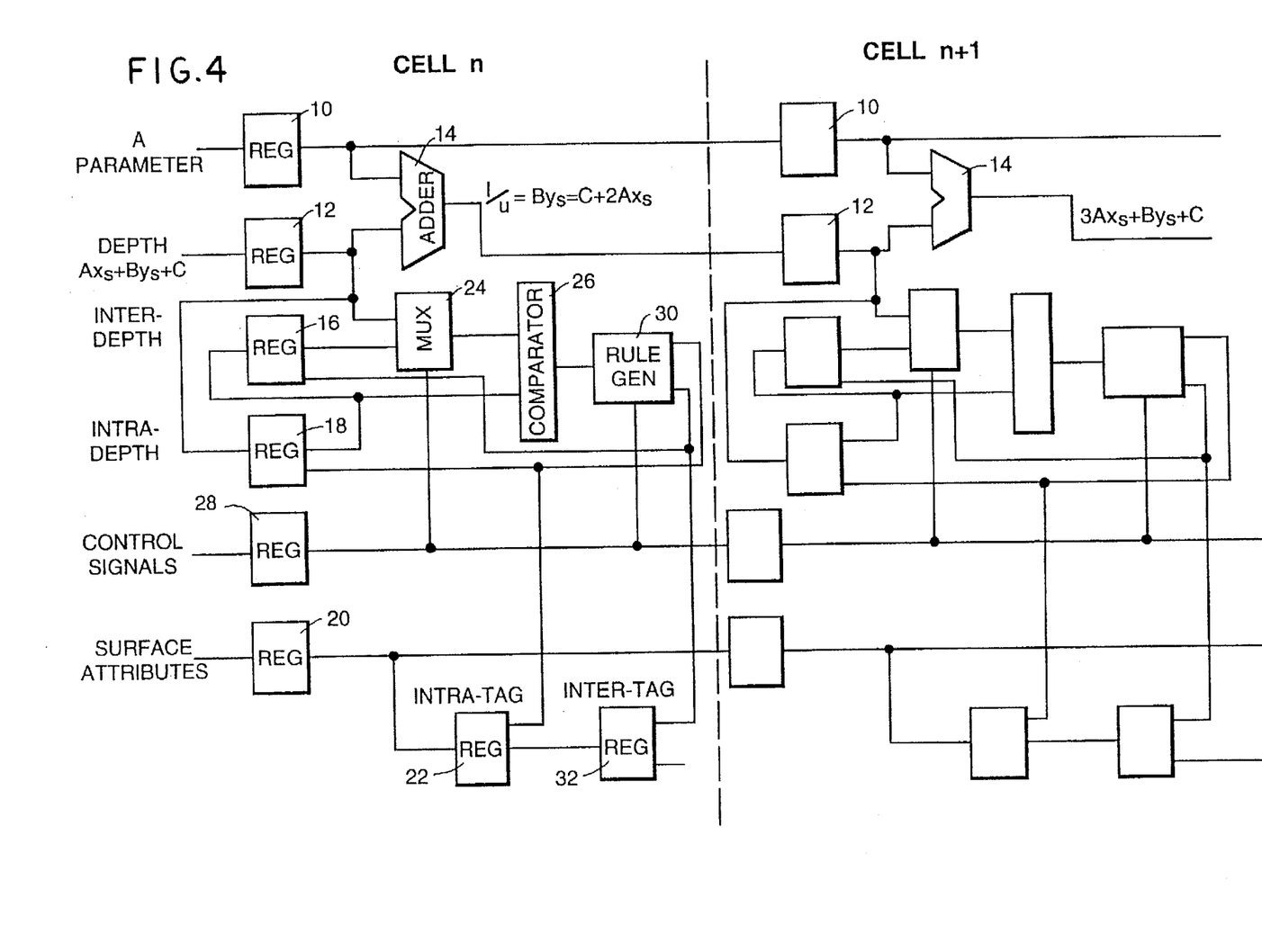
FIG. 4 shows two cells of a pipeline processor embodying the invention.

The inner core of a processor which embodies the invention consists of a series of identical cells which are pipelined together. A typical number would be between 32 and 64 cells. Two such cells are shown in FIG. 4. Each cell works on a single pixel and adjacent cells work on adjacent pixels, i.e.

CELL N processes Pixel (x,y)
CELL N+1 processes Pixel(x+1,y)
CELL N+2 processes Pixel(x+2,y).

This is achieved by the top portion of a cell as shown in FIG. 4. For a particular surface a parameter A is lodged in a register 10 at the start of each cycle and a depth parameter representing Axs+Bys+C is lodged in a register 12 at the start of each cycle. These two values are combined in an adder 14 to give a new depth parameter 2Axs+By+C for the horizontally adjacent pixel, which is lodged in the register 12 in the following cell. Parameter A is also lodged in a corresponding register 10 in the next cell. The values in registers 10 and 12 in the following cell are then combined in a corresponding adder 14 whose output forms the input to register 12 in the next cell in the pipeline.

The surfaces defining the various objects are stored as a list and are processed in a sequential fashion. The surfaces are grouped in terms of the objects which they define and are so ordered that all the forward surfaces are based at the start of the group followed by the reverse surfaces. This is shown below:

object N+1 surface M+9 reverse
object N+1 surface M+8 reverse
object N+1 surface M+7 forward
object N+1 surface M+6 forward
object N surface M+5 reverse
object N surface M+4 reverse
object N surface M+3 reverse
object N surface M+2 forward
object N surface M+1 forward
object N surface M forward.

The parameters A, B and C which define each surface are stored with an operation code which includes other surface attributes. One of these may be a surface tag used as an index for a look-up table to shade the surface. Alternatively the tag could comprise the actual R, G, B values for that surface. Additional information in the operation code is used by the processor to decide what to do with each surface. The type of information the code might contain is as follows:

start of a new object
forward or reverse surface
start of surface data for the whole scene
end of surface data for the whole scene
shadow object
transparent object.

This information is represented by the control signals which are input to a signal and are stored on a register 20 in a cell from where they may be assessed as required.

At the start of a new object the depth of the first surface in that object for the pixel being processed is stored in the intra-depth register 18. Surface tag data such as surface shade are stored in the intra-tag register 22. At the same time the previous intra-depth value from the previous object is compared against the value in the inter-depth register 16 which stores the processed visible surface depth for the pixel being processed. If the intra-depth value is greater than the inter-depth for hat pixel then the value in the intra-depth register is transferred to the inter-depth register 16. Thus the system compares, with the end of the processing of the surfaces of an object, the nearest visible surface in that object with the nearest visible surface detected so far in the scene for that particular pixel. Register 16 is updated if necessary.

In order to compare intra-depth and inter-depth values MUX 24 is used to switch the output of register 16 to one of the inputs of comparator 26, the other of which receives the output of register 18.

While the surfaces of a single object is being processed MUX 24 is controlled by the control signal lodged on register 28 to connect register 12 and register 18 to the inputs of comparator 26. For forward surfaces, if the current surface depth is greater than the intra-depth value then the intra-depth register remains the same. For reverse surfaces the opposite action is taken. Thus at the start of processing of an object the intra-depth register contains the nearest surface to the eye of the previous object. After all objects have been processed the inter-tag and the inter-depth registers contain data defining the nearest surface to the eye for the pixel that the cell was working on.

A rule generator 30 is used to implement updates to inter-depth register 16 and inter-tag register 32 when a nearer visible surface is detected.

A shadow may be rendered by the system by flagging certain objects as shadow volumes. The shadow volume is a region of space which is swept out by the silhouette edge of an object illuminated from a point light source. Any objects within this volume are deemed to be in shadow.

Shadow objects are processed in the same way as solid objects. When all shadow and non-shadow objects have been processed it is straightforward to determine whether the surface assigned to a pixel is in shadow by comparing the position of that surface with the furthest forward surface and nearest reverse surface of the shadow object and checking to see if the visible surface is within that range. If it is a flag associated with that surface is set to indicate that a modification to its shade or colour needs to be made to simulate the effect of shadowing. The system can be made versatile enough to deal with illumination from more than one point light source and thus with more than one shadow shade.

In the circuitry of FIG. 4 a shadow object is handled slightly differently in that after all the forward surfaces have been processed the intra-depth register 18 is compared with the inter-depth register 16. If the intra-depth value is greater than the inter-depth value then a flag is set in the inter-tag register 32. After all the reverse surfaces have been processed the intra-depth value is again compared with the inter-depth value. If the intra-depth value is greater than the inter-depth value then the flag is cleared. One flag is provided for each light source which can cast shadows. If after processing all the shadow objects there are any shadow flags set then the colour of the surface for that pixel will be modified to simulate the shadow condition. All these actions are performed by the rule generator 30 in FIG. 4. This receives all the control signals and, via competent selectorial logic selectively enables the registers for updating.

The system is able to deal with transparency and particularly with absorption transparency. This is the situation in which light rays lose energy in particular wavelengths when passing through a transparent object and thereby cause the light ray to change colour.

The absorption effect is stimulated by flagging certain objects as being transparent. These are processed after the opaque objects. Transparent objects are processed by the usual set of intra rules. If for a particular pixel a transparent object appears in front of the visible surface at that pixel then a flag is set to indicate this condition. If the flag of set the colour of the surface at that pixel is modified to simulate transparency. Further software can be provided to derive the thickness of the transparent object thus making an appropriate further modification to the colour of that pixel.

This method is used for objects which are completely transparent. However it is possible to have a single surface of an object invisible, for example a tube. Thus non-closed convex volumes may be generated. To generate this type of arrangement, after an object has been processed the reverse surfaces are passed in again. If the forward surface was visible am a pixel and has an invisible flag set then it has its depth and tag values replaced by the reverse surface which is nearest to the viewpoint. It is then classed as a forward surface for all further operations. If the reverse surface was also invisible then the surface is left as a reverse surface and will take no further part in depth operations. Thus open ended cylinders may be generated.

In the circuitry of FIG. 4 when a transparent object is processed the intra rules stay the same. However, when a transparent intra-depth is compared against the inter-depth register the inter-depth always remains the same. If transparent intra-depth is greater than the inter-depth value then a flag is set in the inter-tag. This can then be used to modify the colour at a later stage to simulate transparency.

Figure 5:
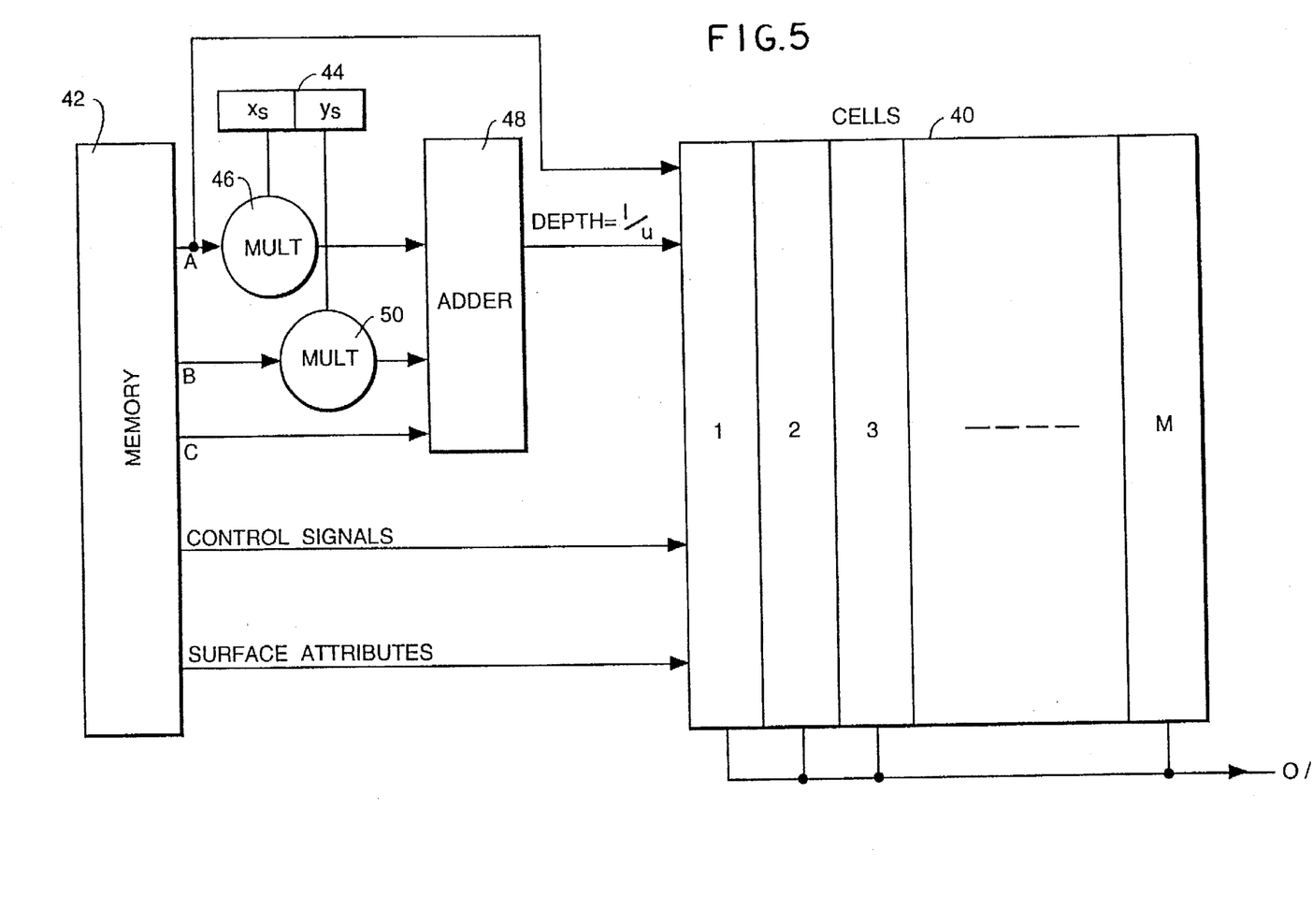
FIG. 5 shows a block diagram of a processor embodying the invention.

FIG. 5 shows a simple processor including a plurality of the cells of FIG. 4 which are indicated at 40. A total of M cells are cascaded together and typically M will equal 32. A memory 42 stores A,B and C values representing every surface in an image to be displayed. A register 44 stores the X and Y values for the start of each block of an image to be processed.

At the start of processing A,B and C values of the first surface in the first object to be displayed are supplied at outputs from the memory. The A value is multiplied by the initial X coordinate or the first pixel in the block in a multiplier 46 and is provided as an input to an adder 48. The corresponding B value is multiplied by the Y value of the first row of pixels to be processed in a multiplier 50 the output of which forms another input to the adder 48 the C value is supplied directly to an input of adder 48.

The output of the adder represents the depth value for the first surface at the first pixel. This is supplied to the first of cells 40.

In the first of cells 40 the inter-depth and intra-depth register 16 and 18 are both initially set to 0 and so this initial depth value will be read to both registers. The A parameter is also supplied directly to cell 40 where it is combined with the initial depth value in the adder 14.

On the next clock cycle the A parameter is fed through to register 10 in the second cell and the updated depth value supplied by adder 14 is supplied to register 12. At the same time the A,B and C parameters for the next surface in the object being processed are supplied by multipliers 46 and 50 to adder 48 and hence the depth values are supplied to the first cell which will compare the depth of the second surface with that of the first surface and, in dependence on the comparison with the current value stored in the intra-depth register 18, and whether the new and existing surfaces are forward or reverse, may update the value stored in he intra-depth register 18. If the register is updated then the intra tag register 22 which stores surface attributes will also be updated.

At the end of the list of surfaces for an object the value in the intra-depth register is compared with that in the inter-depth register to see if the latter should be updated with a closer visible surface.

The process continues for all surfaces in the object until all have passed through the array of cells 40. As soon as the last surface in an object has been supplied by the memory 42 the first surface of the following object is supplied. Thus there is no break in the chain of surfaces being supplied to the cells 40.

Once all the surfaces for all the objects have been processed the X portion of the register 44 is incremented by M, e.g. 32, the number of cells in the processor. The entire list of objects is then again sequentially processed for the new block of cells. This process continues until an entire line of pixels has been processed at which point the Y portion of register 44 will be incremented by 1 and the X portion will be reset to its initial value representing the start of the next line of data to be processed. The connections for incrementing the X and Y portions of register 44 are not shown in FIG. 5.

Various extensions to the system are possible to enhance the quality of the output picture. These are discussed below.

Anti-aliasing

Anti-aliasing can be achieved very simply by using a multi-pass technique. In this method each object is processed a number of times. Each time the object is processed its position is changed by a sub-pixel amount and the pixel colour is accumulated over the passes. At the end of the passes the final colour value is divided by the number of passes. The number of passes made depends upon the quality of the final image required. For instance, if ½ pixel accuracy is required four passes would be made, with the objects moved by half pixel increments each time. Thus the ray would effectively be projected through each quarter of the pixel and the results averaged.

Soft Shadows

Soft shadows are caused by the consequence of using lights which are not point sources, thus a point on a surface may see only part of a light. The transition from seeing a partially obscured light, corresponding to the penumbra, to complete obscuration, corresponding to umbra causes the soft edge of the shadow and anti-aliasing of the shadow edge is required.

This effect can be simulated by a multipass technique where the light point used to generate the shadow volume is moved between passes. The results are accumulated between passes and the final colour value is divided by the number of passes made.

Depth of field

Depth of field, where objects are in focus or blurred as a function of their distances from the camera, simulates a camera view, rather than a human eye view. This effect can also be achieved by using a multipass approach. To achieve this the A & B parameters are slightly changed between passes and the results accumulated as before.

Motion Blur

Motion blur simulates the effect of relative motion between a camera and a scene and is a practicable method of temporal anti-aliasing. This effect is also generated by a multipass approach. The object which is to be blurred is moved between passes and the results are accumulated as in the previous cases.

Curved Surfaces

It is possible to extend the algorithm to process curved surfaces by using the technique of forward differencing. Rather than having just three parameters associated with each surface there would now be for instance second and third order derivatives which would be accumulated as well. This would allow quadratic and cubic surfaces to be represented and thus a more realistic image can be produced.

Constructive Solid Geometry

With extensions to the rule generator and extra registers to store both the forward and reverse depths it is possible to implement some of the CSG boolean primitives. This would allow for instance, two objects to subtracted from one another. Thus, you could generate an object with a hole in it by subtracting a smaller cube from it.

Eye Point intersections

In the situation where a surface is oriented so as to pass directly through the eye point a divide by zero condition exists, a condition which occurs at silhouette edges. Hence the surface should go from positive infinity to negative infinity across a single pixel. As this is not possible with the system described the surface has to be perturbed to avoid this condition. This perturbation can, however, cause the silhouette edge formed by this surface to appear to move, thereby reducing the realism of the image.

By attaching flag to the surface to indicate that it passes through the eye point it is possible to remove this problem. When the flag is asserted and the surface has positive depth then the depth is set to the maximum value allowed by the system. When the flag is asserted and the surface has negative depth then the depth is set to the minimum depth values allowed by the system. Thus a surface can go from maximum depth to minimum depth in one pixel.

Performance Enhancements

The performance of the proposed architecture can very easily be increased by increasing the number of cells. In the previous examples 32 cells have been used. However there is no reason why 256 or more cells could not be used instead. The total number of cells will be a trade off between cost and performance given the technology which is to be used. It is also very easy to cascade a number of the proposed devices together to increase performance. This could be done by pipelining or running several devices in parallel, or a combination of both.

Another method of increasing performance would be to subdivide the screen into a number of tiles. Then, for each tile those objects within the tile would be processed, thus decreasing the average number of surfaces to be processed.

A further method which could be combined with those above would be to discard objects when it has been detected that they are no longer required in the scene. All that is required is to have a flag which is set once the view is inside an object, and which is cleared when the view is no longer in the object. When the flag is cleared that object takes no further part in the processing for that raster line.

System Architecture

Figure 6:
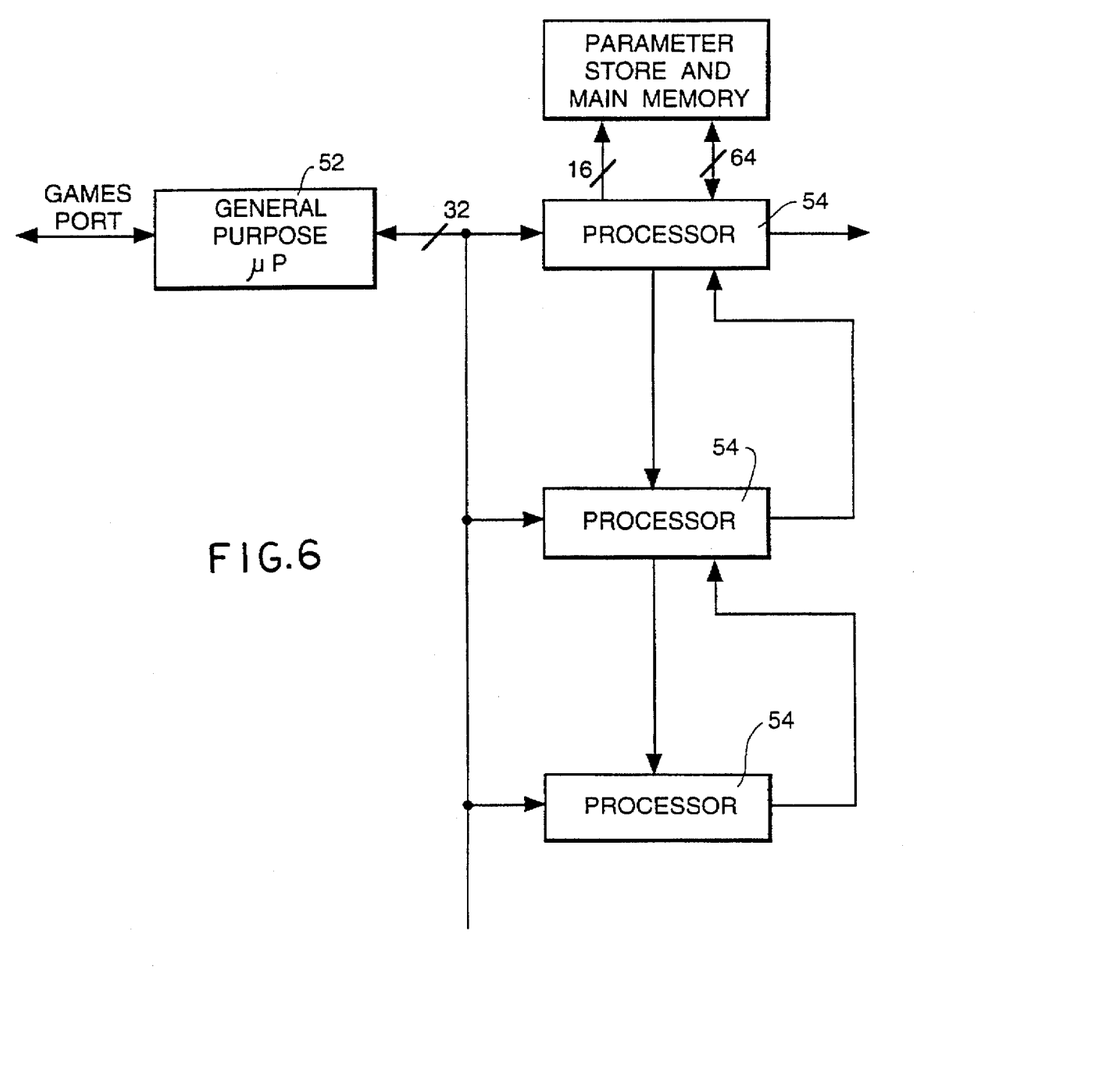
FIG. 6 shows a system using a processor embodying the invention.

A system using the architecture of the invention is shown in FIG. 6. This comprises a general purpose microprocessor 52 which communicates with an interface such as a games port. This communicates via a 32 bit bus with a plurality of processors 54 embodying the invention. The first processor to which the bus is connected is also coupled via two busses to a parameter store and main memory in which all the surface coordinates of a scene are stored. This may be a random access memory which can be updated with data relating to different scenes.

The main core of each processor 54 is the array of cells described with reference to FIGS. 4 and 5 and is shown in more detail in FIG. 7.

Figure 7:
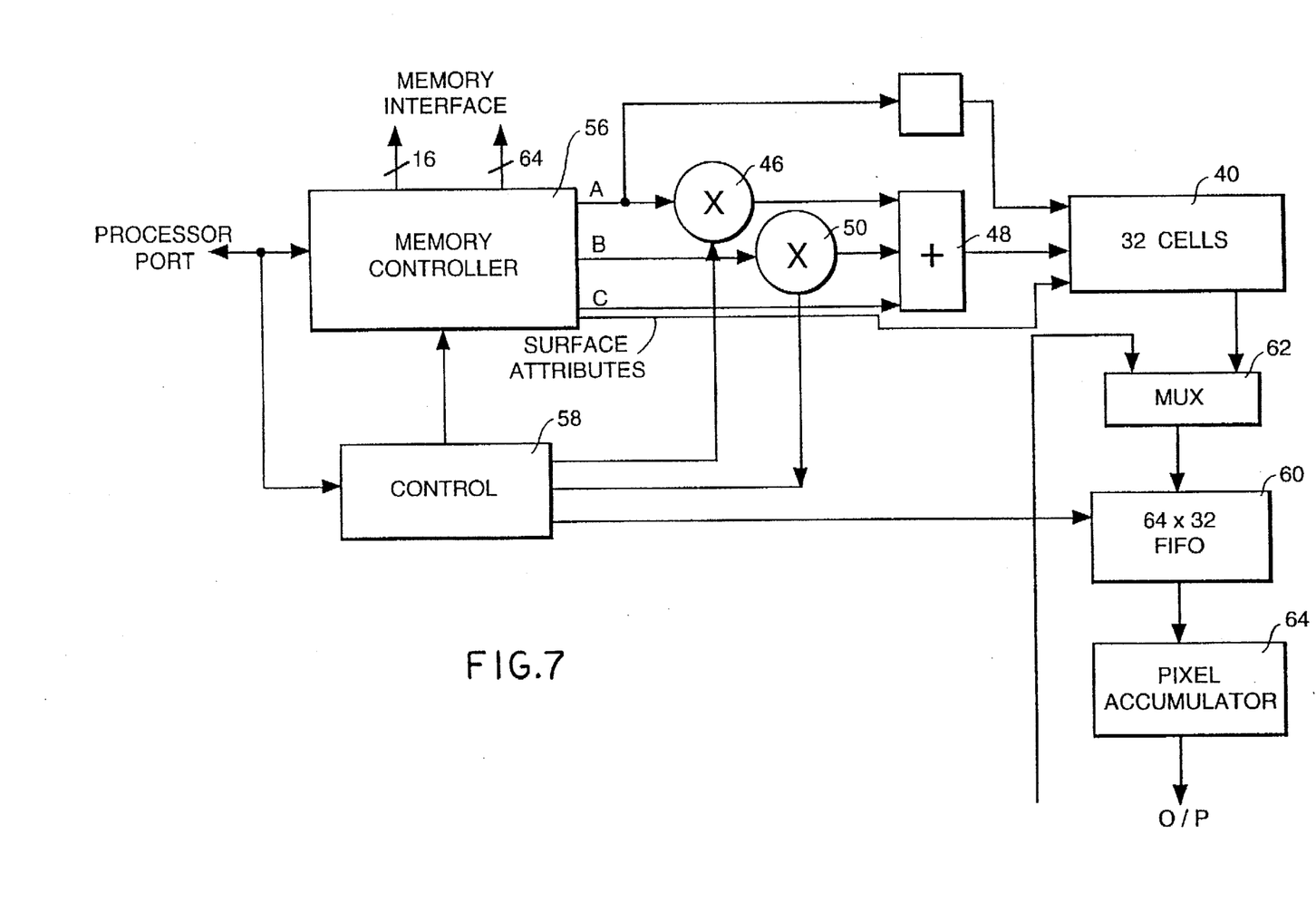
FIG. 7 shows a block diagram of the architecture of the processor of FIG. 6.

FIG. 7 comprises a memory controller 56 which interfaces with the parameter store and main memory and with the processor port of microprocessor 52. The cell array 40 multipliers 46 and 50 and the adder 48 correspond to those shown in FIG. 5 with the X and Y starting values being supplied by a control register 58. The control register 58 also supplies control signals to the memory controller which in turn supplies appropriate control signals with the surface attributes to the cells 40.

A first in first out (FIFO) register 60 is coupled to the output of the cells 40 via a multiplexer 62 and is used to accumulate processed values and thus decouple the output of the processor from the cells. A pixel accumulator 64 is provided to allow the various multipass techniques described above to be implemented.

The output of FIG. 7 can be connected to a high performance bus for feeding pixel data to a frame buffer, or alternatively it could be connected directly to a digital to analogue converter and supplied to a display unit. Input to the unit can be either a games type port which would interface to joysticks, ROM cartridges, and other games input devices, or it could be a host computer interface such as IBM PC bus interface.

Memory controller 57 is able to perform functions such as rotations, translations, etc on the scene being processed in response to signals supplied from the processor port.

The whole of the circuitry shown in FIG. 7 can be supplied on a single chip. Alternatively only a portion of this circuitry could be provided on a single chip.

Figure 8:
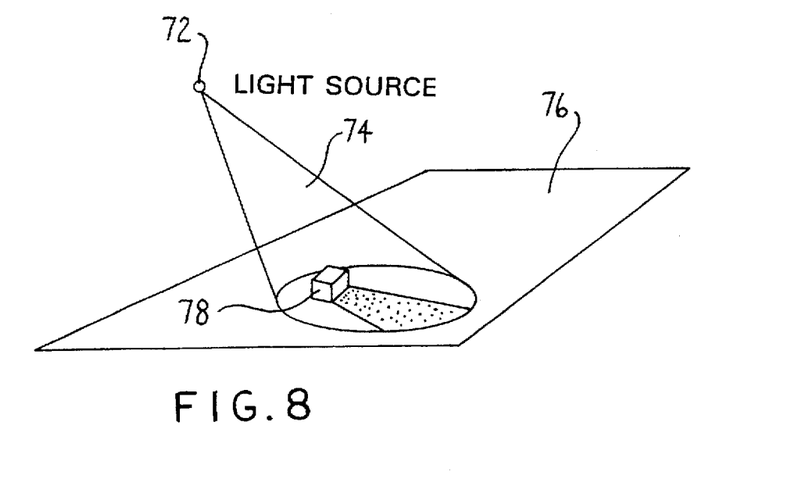
FIG. 8 schematically shows a spotlight type effect to be modelled.

In order to make computer-generated three-dimensional images more lifelike, it is important to be able to simulate the effect of a spotlight in a night time scene. For example, car headlights, search lights, and landing lights are all things which it may be desired to simulate. The type of effect is illustrated in FIG. 8 in which a light source 72 illuminates a cone-shaped volume 74 of light which is projected onto a surface 76. An object 78 positioned on the surface is illuminated by the cone of light 74.

The cone-shaped volume 74 is referred to as a light volume. This is to all intents and purposes, the opposite of the shadow volumes which are discussed above. A light volume is a region of space whose shape is determined by the characteristics of the light source. All objects or parts of objects which are outside this area are in shadow with respect to the light source.

In order to render the scene the object 78 is defined as a set of surfaces as is the light volume 74. In the case where three-dimensional shapes are concave it is preferable, as discussed above, to model the object as a collection of convex objects as illustrated in FIGS. 2A, 2B, and 2C. FIGS. 2A and 2B show two concave objects arranged to intersect to produce an object with concavities. FIG. 2C shows how an object with concavities can be split into two convex objects.

As discussed above, after all the non-shadow convex objects have been processed, we have, at any particular pixel, the distance to the visible surface at that point. Thus, to find whether the surface at that pixel is in a light object we then need to process the surfaces defining the light volume 74 to find the furthest forward facing surface and the nearest reverse facing surface of the light object. If the furthest forward facing surface is closer to the viewpoint than the nearest reverse facing surface and the visible surface between them, then that visible surface is within the light volume. If the furthest forward surface is nearer to the viewpoint and the nearest reverse surface and the visible surface is between them then the surface of the object is within the light volume and a flag is associated with it to indicate that its colour will need to be modified to simulate the effect of light. If the furthest forward surface is further from the viewpoint than the nearest reverse surface then the object is outside the light volume and a flag has to be set to indicate that this colour will need to be modified to simulate the effect of shadowing.

Light volumes are processed before the shadow volumes discussed above. If a surface of a pixel is outside the light volume then the shadow flag associated with the surface is asserted. In the case of surfaces falling within the light volume shadow volumes are generated within the light volume to simulate shadows cast by the light source and hence objects within the light volume cast shadows.

Light volumes do not require any additions to the architecture illustrated in FIGS. 4 and 5. The only change that is required is that the operation code associated with each plane has to be extended so that planes can be classed as light volume objects, just as there is currently an operation code to indicate shadow volume objects. The light volume object uses the same logic as the shadow volume object except that the output to the shadow flag is inverted if the surface is a light volume surface.

Turning now to ways in which the performance of the rendering system may be improved, it has been proposed that the screen be divided into a number of sub-regions or tiles. Then, for each tile, only those objects within the tile will be processed. This, decreases the average number of surfaces to be processed when determining which surface is visible at any particular pixel.

A gross elimination process such as surrounding complex objects with bounding volumes can be first used to test which objects apply to the current region being rendered. The bounding volume is defined by finding the areas to which particular objects apply. The sub-regions can, in general, be any shape. However, the simplest technique is to divide the screen into rectangular tiles.

All the bounding volumes of objects are projected onto screen space (the array of pixels defining the image plane) and are tested against corners of the tiles. Those bounding volumes of objects which are completely outside the tile are discarded for that tile. Thus the number of surfaces which need to be processed per pixel within a tile becomes less and hence the total time to render an image is reduced since the total processing time for all the tiles will be reduced.

Figure 9:
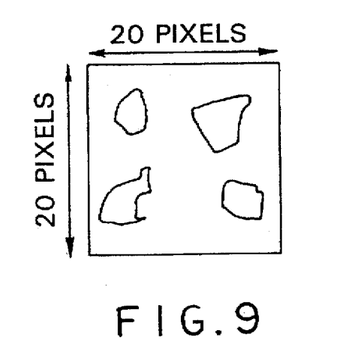
FIG. 9 shows schematically a rectangular tile containing four objects to be processed by the system.

FIG. 9 shows the bounding volumes of four objects projected onto an array of twenty pixels by twenty pixels. If each object is defined by ten surfaces, then the total time to render FIG. 9 will be 400 pixels×40 surfaces which equals 16,000 cycles. FIG. 4, however, shows an area of 20×20 pixels sub-divided into four subarrays of 10×10 pixels. Thus the time to render the objects in FIG. 10 will be defined by the time to render the object in end 10×10 pixel tile. This will be 100 pixels by 10 surfaces which equals 1,000 cycles. Thus to render the whole 20×20 array, the time take will be 4,000 cycles. Thus there is a 75% saving in processing time using this arrangement.

However, the objects of the image are not normally evenly distributed over the entire screen. Therefore, using tiles with variable sizes allows the same performance enhancement to be gained with fewer tiles or better performance with the same number of tiles. This is shown in FIGS. 11 and 12.

Figure 11:
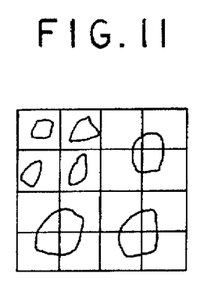
FIG. 11 shows further sub-divisions of tiles.
Figure 12:
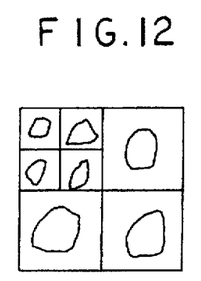
FIG. 12 shows a variable tile size arrangement.

In FIG. 11 there are a total of seven objects and 16 tiles each 5 pixels by 5 pixels. Therefore, the time taken to render a scene will be 16×25×10 which gives 4,000 cycles.

Figure 10:
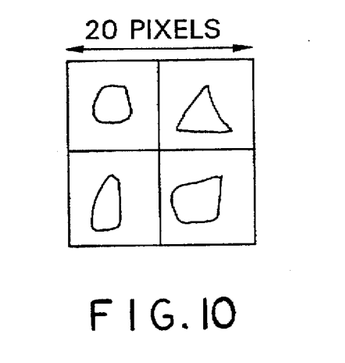
FIG. 10 shows schematically the same tile divided into four sub-tiles for processing.

In FIG. 10 the number of tiles is reduced by having three 10 pixel×10 pixel tiles encompassing the larger objects and four 5 pixel×5 pixel tiles encompassing the smaller objects. The time to process the 10×10 pixel tiles will be 100 pixels×10 surfaces×3 tiles which equals 3,000 cycles. The time to process the 5 pixel×5 pixel tiles is 25 pixels×10 surfaces×4 tiles which equals 1,000 cycles. Thus the total time to render FIG. 12 will be 4,000 cycles, the same as it would take to render FIG. 5. However, FIG. 12 only has 7 tiles as opposed to the 16 of FIG. 5. Thus, a saving is made on the sub-division of the scene into tiles.

In a preferred embodiment of the invention projection techniques are used which project boundary boxes around complex objects. Firstly the distribution of objects around the visible screen is determined and this then allows suitable tile sizes to be defined in dependence on that distribution.

Figure 16:
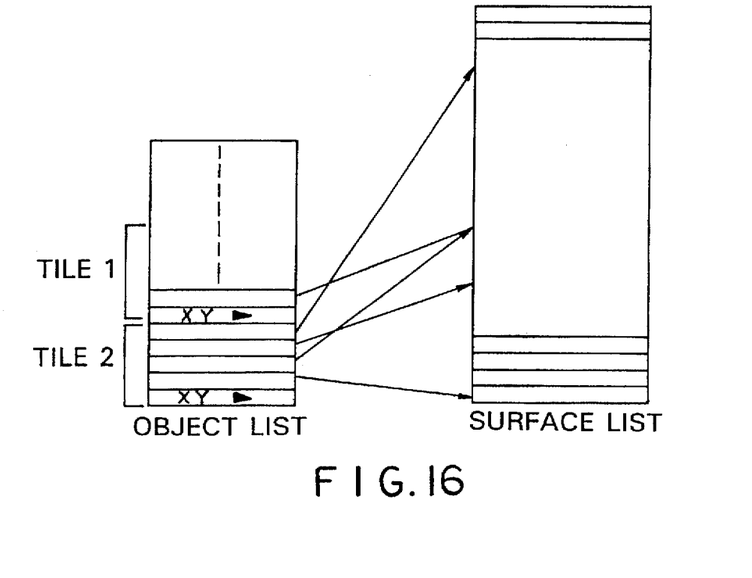
FIG. 16 shows the manner in which surface data is retrieved from memory for use in an embodiment of the invention.

The surfaces defining the various objects are stored in one contiguous list as described above. However, for each tile, (a sub-divided area of the screen), there is another list of object pointers which point to the individual objects which reside in that tile. This is to avoid storing identical surfaces for each tile, as one object made of many surfaces could be in a number of tiles. This is illustrated in FIG. 16. At the start of the object pointer list there is a x,y start position and a x,y size. This gives the top left hand position and the width and height in pixels of the tile. Thus, this allows for variable tile sizes.

At the start of rendering the pointer list is traversed and the x,y position and size is read. The x,y position is stored in register 44 of FIG. 5. This gives the starting position for the rendering. As each pointer is read the appropriate surfaces pointed to are also read and stored in the internal memory. After all the pointers have been read the internal memory contains all the objects to be processed. The objects are processed as normal. After the tile has been rendered the next object pointer list is traversed as described earlier and the internal memory contains all the objects for the next tile. This continues until all the tiles have been completed.

A further improvement to sub-dividing the screen into sub-regions (tiles) is achieved by having the ability to process the tiles non-sequentially.

Figure 13:
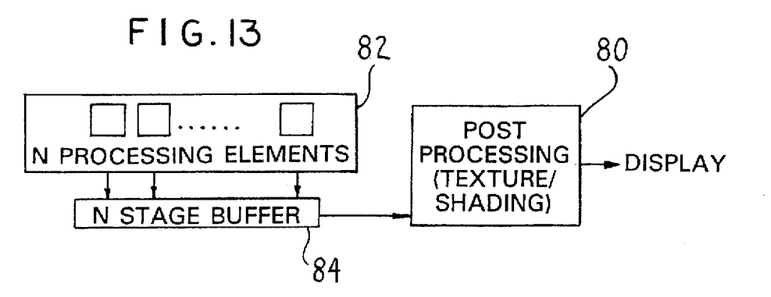
FIG. 13 shows schematically the arrangement for processing elements of the prior art system.
Figure 14:
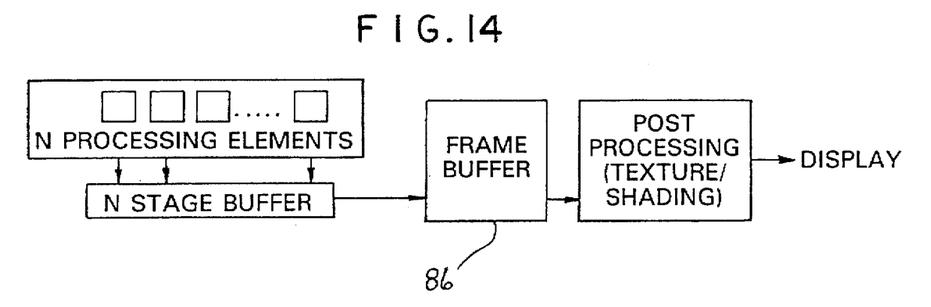
FIG. 14 shows an alternative arrangement for the prior art system.

The system described uses multiple processing elements that operate on a group of adjacent pixels at any one time. For example, if a tile consists of N×M pixels there may be an N element parallel processing engine which will process one row of the tile at a time for each input plane. The processing time, per row, in terms of clock cycles will be equal to the number of planes in or associated with that tile. Such an arrangement is shown in FIG. 13. If there are tiles which have a very small number of planes, then the parallel processing elements may have to stay idle while the last processed row of pixels is post-processed (e.g. has texture and shading added) by a post processing system 80. This receives pixel data from the N processing elements 82, via an N stage buffer 84. The speed will be limited by the speed of the post-processing unit 80.

One way to overcome this speed inefficiency is to ensure that the post-processing unit 80 can match the peak output rate of the N processing elements 82 for a small numbers of surfaces. This would make the post-processing unit more complex and expensive. Another solution would be to interpose a frame buffer 86 between the N stage buffer 84 and the post-processing unit 80 as shown in FIG. 8. Preferably this frame buffer would accommodate the same number of pixels as the display. This, however, would again lead to additional expense.

A preferred embodiment of the present invention solves this problem in an efficient and inexpensive manner by intermixing the processing of rows from tiles so that rows from tiles with a smaller number of planes contained within them are interleaved with rows from tiles with a large number of planes.

Figure 15:
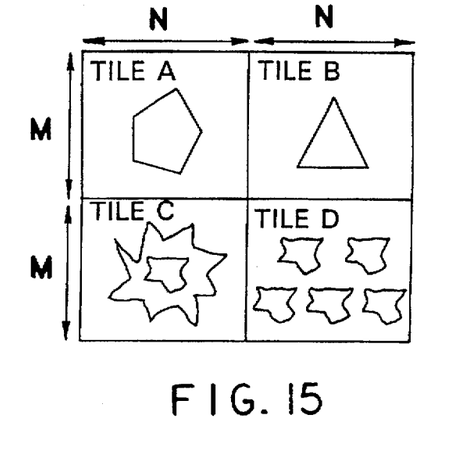
FIG. 15 shows an arrangement of tiles having a different number of surfaces per tile for mixed processing in accordance with an embodiment of the invention.

For example, FIG. 15 shows tiles A, B, C and D all having different numbers of surfaces defining objects within them. If tiles are processed one at a time in the A, B, C, D order then during the processing of the first two tiles the N element parallel processing array 82 will spend idle time since only a small number of planes need to be processed. However, by processing a row from tile A followed by a row from tile C which has a large number of planes associated with it, then the average output rate of data from the N processing elements 82 will be reduced. Thus, the only buffering needed will be the N stage buffer shown in FIG. 13.

The surfaces are stored exactly as detailed above. However, rather than reading in a list of objects for just one tile into the internal memory, two adjacent object lists are read and stored in the internal memory. The first set of surfaces are processed for one line of the first tile which is then followed by processing the second set of surfaces for the second tile. The x,y position of the tiles are stored in two registers such as those numbered 42 in FIG. 10. These are swapped between as lines from the two different tiles are processed. The tiles which are to be processed together have to have their object lists adjacent in the external memory. In the example above with reference to FIG. 16, tile 1 would be tile A and tile 2 would be tile C.

FIG. 5 as discussed above shows an implementation of a system based on an array of pipeline processing cells 40, a precalculation unit 40,46,50,48 and a memory 42. The memory stores a list of instruction words comprising surface parameters (ABC), control bits and surface attributes. The practical and cost effective VLSI implementation of such a system requires that instruction words would be stored in an onchip cache memory. The reasons for this are two-fold. First, the instruction words are in a very long format (typically 96 bits) and therefore sharing external memory with, for example a 32 bit processor would involve multiple bus cycles per instruction word fetch. Secondly, the rate of dispatch of instruction words is directly proportional to the surface processing performance of the system. Taken together these points indicate that any external memory solution must use high speed, wide and dedicated memory.

Using a cache implementation of this system exploits the fact that during the processing of a given scene many references are made to the same instruction word for processing a particular surface. In the variable tile size enhancement presented above the tile size can be optimised such that all tiles contain a roughly constant number of surfaces and thus a roughly constant number of instruction words. If the cache size is larger than this value then all instruction words for a given tile will fit in the cache. Under these conditions the advantage in time is given by the following:

Time to process a tile from external memory=PC×I× MEXT

Time to process a tile from cache memory=I×(MEXT+) PC−1)×MINT)

Percentage improvement=1−(MEXT+(PC−1)×MINT))/ (PC×MEXT) where T=tile size, PE=the number of pipeline elements, PC=the number of pipelines cycles=T/PE, I=the number of instruction words per tile, MEXT=external memory access time, MINT=cache memory access time.

As scene complexity increases practical limits to cache size dictate that not all instruction words in the given tile can be cached.

The problem of scaleability of memory capacity in a multichip implementation of the system described above can be solved by a further embodiment of the invention.

Figure 17:
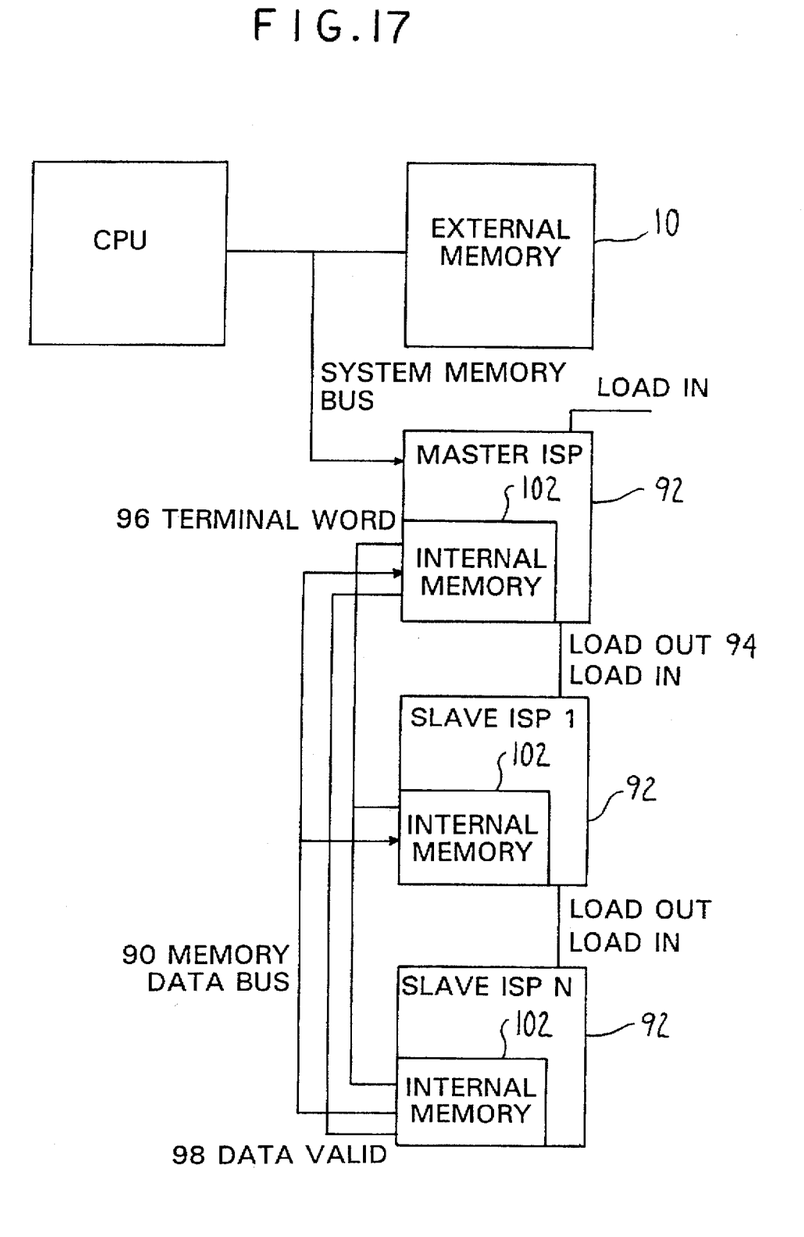
FIG. 17 shows a plurality of pipeline processors embodying another aspect of the invention.

An implementation of a 3D rendering system consisting of N 3D processing units (henceforth referred to as ISP), a system processor and system memory, is shown in FIG. 17. Each ISP 92 contains an M instruction word memory which functions as described above. In such a configuration all ISP's are working on a different output line of the same tile, and are thus all operating on the same instruction word at any given time. For the purpose of this description the ISP working on tile line n is referred to as master, the ISP working on tile line (n+1) is referred to as slave_1, that working on tile line (n+m) as slave_m etc. The memory controllers of all ISP's are connected by a memory interconnect bus 90 consisting of the following elements:

1) Data Bus 90: Width of instruction word: Bi directional
2) Load In/Load Out 94: Synchronous daisy chain signals which indicate transfer of cache masterchip: input/Output.
3) Terminal Word 96: Indicates that current instruction word is the last in the list—driven by chip which is currently transmitting data.
4) Data Valid 98: Driven by the current transmitter to qualify data on data bus.

The master ISP 92 is designated by having its load__in input tied '1' at reset. The master is responsible for following a hierarchical list of pointers which ultimately reference instruction words. At the start of a given tile a memory load phase begins in which the master ISP will begin fetching instruction words from system memory 10 assembling the words internally and transmitting them in a synchronised fashion to three destinations: the master internal memory 108, the master processing pipeline and the memory data bus 90. At this point only the master is storing instructions in its memory. The data valid signal is necessary in systems where the master may be denied access to system memory for periods of time. It is also used to indicate a data bus turn around cycle which occurs when memory data bus ownership changes.

On the transfer cycle when the master memory is full, the master drives load__in of slave__1 to '1', indicating that slave__1 must begin storing instruction words in its memory. This process continues down the chain of slave ISP's until the final instruction word is passed out by the master. At this point terminal__word is driven to '1', and the slave which is currently loading its memory latches the value of the terminal memory address. This completes the memory load phase.

There follows a series of memory read phases which continue until the current tile processing is complete. Memory read commences with the master ISP reading out its instruction word list and passing the values to its processing pipeline and to the memory data bus. On the final access, the master drives load__in of slave__1 to '1', indicating that slave__1 must begin reading instruction words from its memory. This process continues down the chain of slave ISP's until the final instruction word is passed out by the final slave. At this point terminal__word is driven to '1', and the process repeats from the master. Note that there will be a lost cycle between each change of data bus mastership to allow for the turnaround time of the buffers.

I claim:

1. A method for shading a three dimensional image for display on a screen comprising the steps of:
   representing each object in the image by a group of infinite surfaces;
   for each elementary area of the screen projecting a ray into the 3-dimensional image;
   determining the location of the intersection of the ray with each surface;
   determining whether any intersected surface is visible at that elementary area; and
   shading the elementary area for display in dependence on the result of the determination.

2. A method for shading a three dimensional image for display on a screen according to claim 1 in which each surface is designated as a forward facing surface or a reverse facing surface and the relative locations of intersections with forward and reverse facing surfaces are used in determining whether a surface is visible.

3. A method for shading a three dimensional image for display on a screen according to claim 2 wherein an elementary area is visible if the furthest forward facing surface intersection is closer to the projection point of the ray than the furthest reverse facing surface intersection.

4. A method for shading a three dimensional image for display on a screen according to claim 1 in which for each elementary area a ray is projected in turn through the groups of surfaces representing the objects in the image.

5. A method for shading a three dimensional image for display on a screen according to claim 4 in which for each elementary area a ray is projected through each surface in turn of each group of surfaces representing an object.

6. A method for shading a three dimensional image for display on a screen according to claim 4 in which the nearest visible surface in a group of surfaces representing an object is compared with the nearest visible surface from all preceding groups of surfaces and the elementary area is shaded in dependence on the result of the comparison.

7. A method for shading a three dimensional image for display on a screen according to claim 1 including the steps of:
   designating an object as a shadow object;
   determining a boundary of the shadow object on each ray passing through each elementary area; and shading an elementary area with a modified shade if a surface visible in that elementary area is within the boundary of the shadow object.

8. A method for shading a three dimensional image for display on a screen according to claim 1 including the steps of:
   designating an object as a transparent object; and
   modifying the shade applied to an elementary area if the visible surface at the elementary area is behind the transparent object in the image.

9. Apparatus for shading a three dimensional image for display on a screen comprising:
   means for supplying data defining group of infinite surfaces representing each object in the image;
   means for generating a depth value for each surface for each elementary area of the screen in dependence on the distance of that surface from an image plane;
   means for determining whether any surface is visible at that elementary area; and
   means for shading that elementary area in dependence on the result of the determination.

10. Apparatus for shading a three dimensional image for display on a screen according to claim 9 in which each surface is designated as a forward facing surface or a reverse facing surface and the relative depths of forward and reverse facing surfaces are used in determining whether a surface is visible at an elementary area.

11. Apparatus for shading a three dimensional image for display on a screen according to claim 9, including:
   means for comparing the relative depths of visible surfaces in the image for each elementary area and shading the elementary area in dependence on the result of the comparison.

12. Apparatus for shading a three dimensional image for display on a screen according to claim 9 in which the depth value generating means generates a depth value for each surface of each object in turn for each elementary area of the image.

13. Apparatus for shading a three dimensional image for display according to claim 9 provided on a single integrated circuit.

14. A method for shading a three dimensional image for display comprising the steps of:

supplying data defining a group of infinite surfaces representing each object in the image;

for each elementary area of the display generating a depth value for each surface in dependence on the distance of that surface from an image plane;

determining whether any surface is visible at that elementary area, and shading that elementary area in dependence on the result of the determination.

15. A method for shading a three dimensional image for display on a screen according to claim 14 in which each surface is designated as a forward facing surface or a reverse facing surface and the relative locations of itersections with forward and reverse facing surfaces are used in determining whether a surface is visible.

16. A method for shading a three dimensional image for display on a screen according to claim 15 wherein an elementary area is visible if the furthest forward facing surface intersection is closer to the image plane than the furthest reverse facing surface intersection.

17. A method for shading a three dimensional image for display on a screen according to claim 14 in which the depth value for the nearest visible surface in a group of surfaces representing an object is compared with the depth value for the nearest visible surface from all preceding groups of surfaces and the elementary area is shaded in dependence on the result of the comparison.

18. A method for shading a three dimensional image for display on a screen according to claim 14 including the steps of:

designating an object as a shadow object;

determining depth values for surfaces making up the shadow object for each elementary area; and shading an elementary area with a modified shade if a surface visible in that elementary area is within the boundary of the shadow object.

19. A method for shading a three dimensional image for display on a screen comprising the steps of:

representing each object in the image as a group of infinite surfaces;

for each elementary area of the display projecting a ray into the 3-dimensional image;

determining the location of the intersection of the ray with each surface;

determining whether any intersected surface is visible at that elementary area;

and including the steps of:

designating an object as a light volume;

determining the intersection of each ray with the light volume; and shading an elementary area in dependence on the surface visible at that elementary area and its location in relation to the light volume.

20. A method for shading a three dimensional image for display on a screen comprising the steps of:

representing each object in the image as a group of infinite surfaces;

determining a bounding volume for each object projected onto the display screen;

subdividing the display into a plurality of sub-regions, the size of the sub-regions being dependent on the complexity of the image in each area of the screen;

for each pixel of each sub-region projecting a ray into the image;

determining the location of the intersection of the ray with each surface of each object contained within that sub-region;

determining whether any intersected surface is visible at that pixel; and shading the pixel in dependence on the result of the determination.

21. A method for shading according to claim 1 including the step of interleaving the determination of ray surface intersections for rows of pixels in a sub-region with the determination of ray/surface intersections for rows of pixels in other sub-regions.

22. A method for shading a three dimensional image for display on a screen comprising the steps of:

representing each object in the image as a group of infinite surfaces;

subdividing the screen into a plurality of sub-regions,;

for each pixel of each sub-region projecting a ray into the image;

determining the location of the intersection of the ray with each surface of each object contained within that sub-region;

determining whether any intersected surface is visible at that pixel; and shading the pixel for display in dependence on the result of the determination, wherein the determination of ray/surface intersections for groups of pixels in one sub-region is interleaved with the determination of ray/surface intersections for groups of pixels in other sub-regions.

23. A method for shading according to claim 22 wherein the groups of pixels comprise lines of pixels in the sub-regions.

24. A method for shading according to claim 22 wherein groups of pixels from sub-regions in less complex parts of the image are interleaved with groups of pixels from sub-regions in more complex parts of the image.

25. An apparatus for shading a three dimensional image for display on a screen comprising;

a plurality of groups of processing elements for determining depth values for surfaces in the image for each elementary area of the screen in dependence on the distances of the surface from an image plane and for determining whether any surface is visible at that elementary area, wherein each group of processing elements has an associated cache memory means for storing data defining the various surfaces in the image, and the groups of processing elements are coupled together by a bus means, and wherein data is read from the associated cache memory means of a first group of processing elements and transmitted via the bus means to the other group of processing elements for determination of depth values until all data from the associated cache memory means of the first group of processing elements has been read and wherein reading of data then takes place from the associated cache memory means of a second group of processing elements.

26. A method for shading a three dimensional image for display on a screen comprising the steps of:

supplying data defining a group of infinite surfaces representing each object;

for each elementary area of the display generating a depth value for each surface in dependence on the distance of that surface from on image plane;

determining whether any surface is visible at that elementary area;

and including the steps of designating an object as a light volume, determining whether any visible surface falls within the light volume; and, shading the elementary area in dependence on the surface visible at the elementary area and its location in relation to the light volume.

27. A method for shading a three dimensional image for display on a screen comprising the steps of:

supplying data defining a group of infinite surfaces representing each object in the image;

determining a bounding volume for each object projected onto the display screen;

subdividing the display into a plurality of sub-regions, the size of the sub-regions being dependent on the complexity of the image in each area of the screen; and for each pixel of each sub-region, generating a depth value for each surface within that sub-region in dependence on the distance of that surface from the image plane;

determining whether any surface is visible at that pixel and shading the pixel in dependence on the result of the determination.

28. A method for shading according to claim 27 including the step of interleaving the generation of depth values surface for rows of pixels in a first sub-region with the generation of depth values for rows of pixels in other sub-regions.

29. A method for shading a three dimensional image for display on a screen comprising the steps of:

representing each object in the image as a group of surfaces;

subdividing the screen into a plurality of sub-regions;

for each pixel of each sub-region generating a depth value for each surface of each object contained within that sub-region;

determining whether any surface is visible at that pixel; and shading the pixel for display in dependence on the result of the determination, wherein the determination of depth values for groups of pixels in one sub-region is interleaved with the determination of depth values for groups of pixels in other sub-regions.

30. A method for shading according to claim 29 wherein the groups of pixels comprise lines of pixels in the sub-regions.

31. A method for shading according to claim 29 wherein groups of pixels for sub-regions in less complex parts of the image are interleaved with groups of pixels from sub-regions in more complex parts of the image.

* * * * *